United States Patent
Yamada et al.

(10) Patent No.: US 7,499,134 B2
(45) Date of Patent: Mar. 3, 2009

(54) LIQUID CRYSTAL DISPLAY APPARATUS

(75) Inventors: Yoshitaka Yamada, Fukaya (JP);
Arihiro Takeda, Sagamihara (JP);
Norihiro Yoshida, Fukaya (JP); Takashi Mitsumoto, Fukaya (JP); Hirokazu Morimoto, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 373 days.

(21) Appl. No.: 11/457,334

(22) Filed: Jul. 13, 2006

(65) Prior Publication Data
US 2007/0024773 A1     Feb. 1, 2007

(30) Foreign Application Priority Data
Aug. 1, 2005     (JP)     ............. 2005-222802

(51) Int. Cl.
*G02F 1/1337*     (2006.01)
(52) U.S. Cl. ................................... 349/129
(58) Field of Classification Search ............ 349/129
See application file for complete search history.

(56) References Cited

U.S. PATENT DOCUMENTS 6,724,452 B1     4/2004     Takeda et al.
6,906,768 B1 *   6/2005     Kim et al. ............ 349/129
2007/0024773 A1  2/2007     Yamada et al.

OTHER PUBLICATIONS

U.S. Appl. No. 11/621,265, filed Jan. 9, 2007, Kawata et al.
U.S. Appl. No. 11/668,238, filed Jan. 29, 2007, Yoshida et al.
U.S. Appl. No. 11/673,168, filed Feb. 9, 2007, Hirosawa et al.
U.S. Appl. No. 12/028,526, filed Feb. 8, 2008, Yoshida et al.

* cited by examiner

*Primary Examiner*—David Nelms
*Assistant Examiner*—Phu Vu
(74) *Attorney, Agent, or Firm*—Oblon, Spivak, McClelland, Maier & Neustadt, P.C.

(57) ABSTRACT

A liquid crystal display apparatus comprising a liquid crystal display panel and an optical unit. The liquid crystal display panel includes a first substrate, a second substrate, a plurality of pixel electrodes, and a plurality of projections. Each of the pixel electrodes has a major axis that is 160 μm or less long. A value obtained by dividing a height of the projections by a gap d between the first and second substrates is 0.14 to 0.6. The projections are 15 μm or less wide as measured in the first direction. The apparatus satisfied the relation of MIN (la, lb)/d<10.

9 Claims, 11 Drawing Sheets

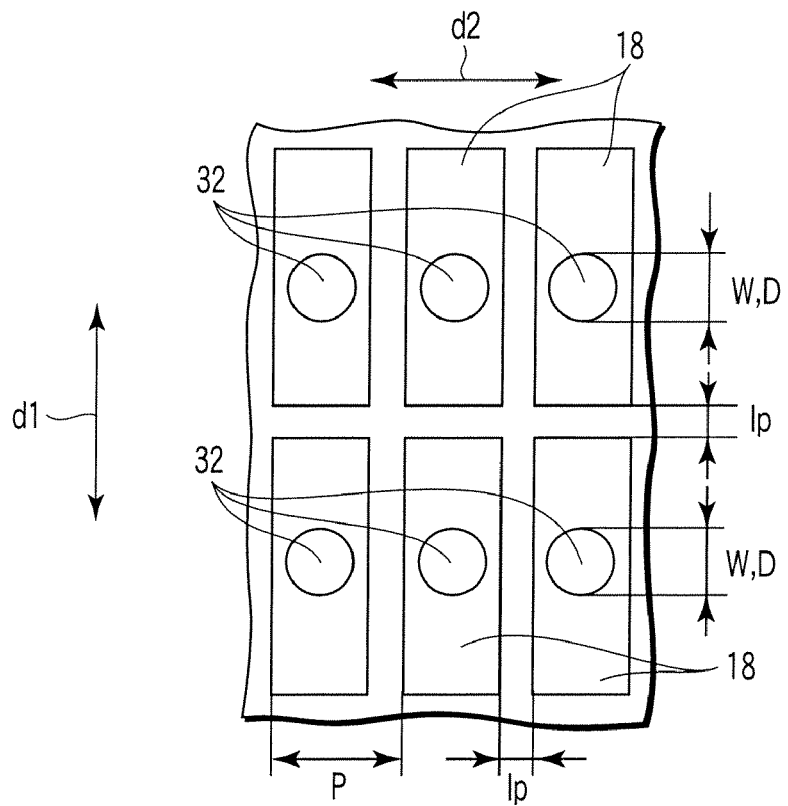
F I G. 6
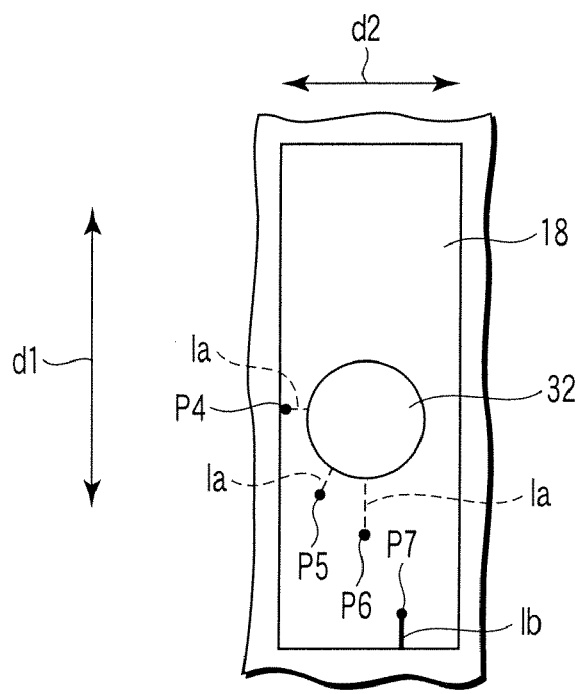
F I G. 7

|  | Embodiments of the invention | | | |
|---|---|---|---|---|
|  | Emb. 1 | Emb. 2 | Emb. 3 | Emb. 4 |
| Screen size | 2.4 in. | 2.8 in. | ← | ← |
| Display mode | Transmissive type | ← | ← | ← |
| Pixel pitch | 332 ppi | 286 ppi | ← | ← |
| Polarizing plate | Circularly polarized light | ← | ← | ← |
| Number of pixels | 640 (cols.) × 480 (horiz.) RGB | ← | ← | ← |
| Alignment type | MVA (2-division) | ← | ← | MVA (radial) |
| Pixel size | 75×25 μm | 90×30 μm | ← | ← |
| Inter-pixel electrodes space 1p | 8 μm | ← | ← | ← |
| Cell gap d (transparent part) | 3 μm | ← | ← | ← |
| Projection — Shape (plane) | Stripe | ← | ← | Circular |
| Projection — Number/pixel | 1 | ← | ← | ← |
| Projection — Width W | 10 μm | ← | 7 μm | 15 μm |
| Projection — Height h | 1.5 μm | ← | ← | ← |
| Projection — h/d | 0.5 | ← | ← | ← |
| Projection — Position | Center in pixel | ← | ← | ← |
| Projection — Direction | Parallel to short side | ← | ← | ← |
| Aperture ratio — With ribs | 45% | 55% | 55% | 55% |
| Aperture ratio — S (Without ribs) | 34% | 45% | 48% | 48% |
| Optical Charact. — Transmittivity | 3.3% | 4.3% | 4.6% | 4.6% |
| Optical Charact. — Contrast ratio | 450 | 480 | 500 | 500 |
| CR10:1 visual angle (up+down/left+right) | 70°/60° | 70°/60° | 70°/60° | 70°/70° |
| Alignment stability | Good | Good | Good | Good |

FIG. 8

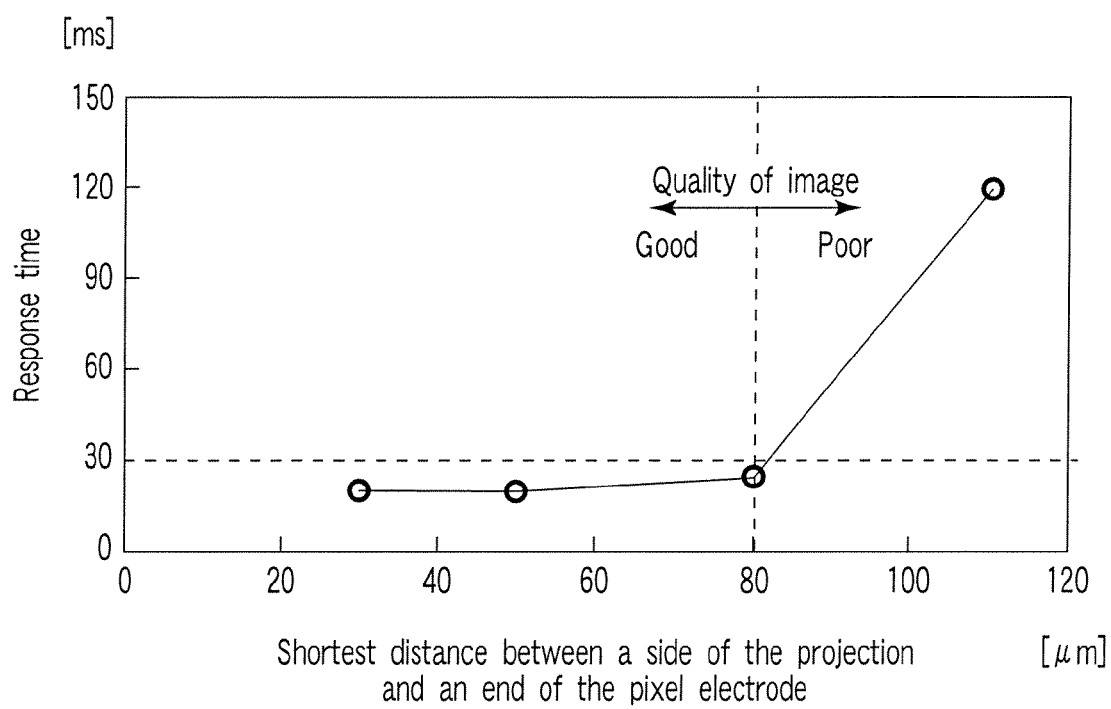
F I G. 13

|  | Comparative example |
|---|---|
| Pixel pitch | 332 ppi |
| Polarizing plate | Circularly polarized light mode |
| Number of pixels | 640 (vertical)×480 (horiz) RGB |
| Alignment type | MVA (2-division) |
| Pixel size | 75×25 μm |
| Projection — Shape (plane) | Stripe |
| Projection — n (umber/pixel) | 1 |
| Projection — Width W | 10 μm |
| Projection — Height h | 1.5 μm |
| Projection — Position | Center in pixel |
| Projection — Direction | Parallel to short side |
| Aperture ratio — With ribs | 50% |
| Aperture ratio — S (Without ribs) | 12% |
| Optical Charact. — Transmittivity | 1.1% |
| Optical Charact. — Contrast ratio | 100 |
| CR10:1 visual angle (up+down/left+right) | 50°/40° |
| Alignment stability | Good |

FIG. 16

LIQUID CRYSTAL DISPLAY APPARATUS

CROSS-REFERENCE TO RELATED APPLICATIONS

This application is based upon and claims the benefit of priority from prior Japanese Patent Application No. 2005-222802, filed Aug. 1, 2005, the entire contents of which are incorporated herein by reference.

BACKGROUND OF THE INVENTION

1. Field of the Invention

The present invention relates to a liquid crystal display apparatus.

2. Description of the Related Art

Generally, the liquid crystal display apparatus has an array substrate, a counter substrate arranged opposite to the array substrate with a gap maintained between these substrates, and a liquid crystal layer held between the array substrate and the counter substrate. The liquid crystal display apparatus is light and thin and consumes but a little power. Therefore, it uses in various apparatuses, as office automation (OA) apparatus, information terminals, clocks and television receivers. If it has thin-film transistors (TFTs) used as switching elements, it can respond to input signals at high speed and can display high-quality images. This is why the liquid crystal display is used as display unit for use in various electronic apparatuses that display a large amount of information, such as portable TV receivers, computers, etc.

In recent years, it is increasingly demanded that images be displayed at high resolution and that the display speed be raised, as information is processed in great quantities. The image resolution is increased by, for example, reducing the sizes of the elements constituting the array substrate that has TFTs as described above. In the vertical aligned mode, i.e., one display mode, the liquid crystal display apparatus can responds to input signals faster than in the conventional twisted nematic (TN) mode. Further, in the vertical aligned mode, any rubbing process that results in defects, for example electrostatic damage, need not be performed.

Particularly, the multi-domain vertical alignment (MVA) mode is widely used in practice, because it is relatively easy to increase the visual angle in this mode. In the MVA mode, a voltage is applied to each pixel that has a projection, thus orienting the liquid crystal molecules in various directions and ultimately improving the symmetry of visual-angle characteristics and suppressing the inversion. In another mode, a negative phase-contrast plate is used, compensating for the visual-angle dependency of the phase difference that the liquid crystal layer when the liquid crystal molecules stand upright, making the layer look black. The contrast visual angle is thereby changed to an appropriate value. In still another mode, an in-plane phase difference is imparted to the negative phase-contrast plate, converting the plate to a biaxial phase-contrast plate, thus compensating for the visual-angle dependency of the polarizing plate, too, and obtaining desirable CR visual-angle characteristics.

Techniques concerning the MVA mode are disclosed in, for example, U.S. Pat. No. 6,724,452 B1. The projection mentioned above is arranged inside the pixel. The local light dissipation or voltage drop resulting from the step defined by this projection reduces the transmittivity of the pixel. Thus, the projection is a factor degrading the quality of image. If the space between any two adjacent pixel electrodes formed in the array substrate is large, the aperture ratio will decrease inevitably reducing the transmissivity. It is therefore desired that the size of the projection and the space between the pixel electrodes be as small as possible, in order to secure high transmittivity and high image contrast. The size of the projection and the space between the pixel electrodes are determined by a tradeoff between optical characteristic and alignment stability.

Recently it is strongly demanded that liquid crystal display apparatuses for use in portable terminals should display high-contrast and high-luminance images. In addition, it is demanded that the liquid crystal display apparatuses should display images at high resolution, as high as 300 ppi or more. The higher the resolution, the smaller the pixel electrodes will be. The surface ratio of the projection to the pixel electrode will markedly increase if the MVA mode is employed. The contrast ratio and the transmittivity will inevitably fall very much. The liquid crystal display apparatus can no longer display images of sufficiently high quality. Accordingly, coexistence with a high-definition which suited the relation of a tradeoff conventionally and acquisition of high transmittivity and high contrast ratio is called for.

The present invention has been made in view of the foregoing. An object of the invention is to provide a high-definition liquid crystal display apparatus that achieves high transmittivity and high contrast ratio.

BRIEF SUMMARY OF THE INVENTION

To achieve the object, according to an aspect of the present invention, there is provided a liquid crystal display apparatus comprising: a liquid crystal display panel which includes a first substrate, a second substrate arranged opposite to the first substrate with a gap therebetween, a liquid crystal layer held between the first and second substrates and made of liquid crystal having negative anisotropic dielectric constant, a plurality of pixel electrodes arranged on the first substrate in the form of a matrix, in a first direction and a second direction intersecting with the first direction at right angles, each pixel electrode having a major axis extending in the first direction, and a plurality of projections provided on the second substrate, overlapping the pixel electrodes, spaced from side of the pixel electrode as measured in the first direction, projecting toward the first substrate and configured to control a direction in which liquid crystal molecules align; and an optical unit which includes a first optical unit provided outside the first substrate and configured to receive light and emits the light, as circularly polarized light, to the liquid crystal display panel, and a second optical unit provided outside the second substrate and configured to emit the circularly polarized light coming through the liquid crystal display panel and emits the light as linearly polarized light, the major axis of each pixel electrode being 160 μm or less long, value obtained by dividing a height of the projections by a gap d between the first and second substrates being 0.14 to 0.6, the projections being 15 μm or less wide as measured in the first direction, and MIN (la, lb)/d<10, where la is the shortest distance between a position coordinate of a pixel electrode of the pixel electrodes and one of the projections, which overlaps the pixel electrode, lb is the shortest distance between the position coordinate and an end of the pixel electrode that is closer to the position coordinate than any other pixel electrode, and MIN (la, lb) is the shorter of the these distances la and lb.

According to another aspect of the invention, there is provided a liquid crystal display apparatus comprising: a liquid crystal display panel which includes a first substrate, a second substrate arranged opposite to the first substrate with a gap therebetween, a liquid crystal layer held between the first and second substrates and made of liquid crystal having negative anisotropic dielectric constant, a plurality of pixel electrodes arranged on the first substrate in the form of a matrix, in a first direction and a second direction intersecting with the first direction at right angles, each pixel electrode having a major axis extending in the first direction, and a plurality of projections provided on the second substrate, overlapping the pixel electrodes, spaced from side of the pixel electrode as measured in the first direction, projecting toward the first substrate, having a height ranging from 0.5 µm to 2 µm and configured to control a direction in which liquid crystal molecules align; and an optical unit which includes a first optical unit provided outside the first substrate and configured to receive light and emits the light, as circularly polarized light, to the liquid crystal display panel, and a second optical unit provided outside the second substrate and configured to emit the circularly polarized light coming through the liquid crystal display panel and emits the light as linearly polarized light, the major axis of each pixel electrodes being 160 µm or less long, the first and second substrate being spaced by a gap d which ranges from 2 µm to 5 µm, the projections being 15 µm or less wide as measured in the first direction, and the projections being shaped like a stripe, extending in the second direction, provided on the pixel electrodes along the second direction, respectively, are so arranged that each divides, along the first direction, the pixel electrode into two parts of almost the same size.

According to still another aspect of the invention, there is provided a liquid crystal display apparatus comprising: a liquid crystal display panel which includes a first substrate, a second substrate arranged opposite to the first substrate with a gap therebetween, a liquid crystal layer held between the first and second substrates and made of liquid crystal having negative anisotropic dielectric constant, a plurality of pixel electrodes arranged on the first substrate in the form of a matrix, in a first direction and a second direction intersecting with the first direction at right angles, each pixel electrode having a major axis extending in the first direction, and a plurality of projections provided on the second substrate, overlapping the pixel electrodes, spaced from side of the pixel electrode as measured in the first direction, projecting toward the first substrate and configured to control a direction in which liquid crystal molecules align; and an optical unit which includes a first optical unit provided outside the first substrate and configured to receive light and emits the light, as circularly polarized light, to the liquid crystal display panel, and a second optical unit provided outside the second substrate and configured to emit the circularly polarized light coming through the liquid crystal display panel and emits the light as linearly polarized light, the major axis of each pixel electrode being 160 µm or less long, value obtained by dividing a height of the projections by a gap d between the first and second substrates being 0.14 to 0.6, the projections being 15 µm or less wide as measured in the first direction, the projections being shaped like a stripe, extending in the second direction, provided on the pixel electrodes along the second direction, respectively, and so arranged that each divides, along the first direction, the pixel electrode into two parts of almost the same size, and each of the first and second optical units being composed of a polarizing plate having a transmission axis and a phase-contrast plate laid on the polarizing plate, having a phase difference of at least 1/4 and a transmission-easy axis making an angle of 30° to 60° with the transmission axis.

According to another aspect of the invention, there is provided a liquid crystal display apparatus comprising: a liquid crystal display panel which has a first substrate, a second substrate arranged opposite to the first substrate with a gap therebetween, a liquid crystal layer held between the first and second substrates and made of liquid crystal having negative anisotropic dielectric constant, a plurality of pixel electrode arranged on the first substrate in the form of a matrix, in a first direction and a second direction intersecting with the first direction at right angles, each pixel electrode having a major axis extending in the first direction, and a plurality of projections provided on the second substrate, overlapping the pixel electrodes, spaced from side of the pixel electrode as measured in the first direction, projecting toward the first substrate and configured to control a direction in which liquid crystal molecules align; and an optical unit which includes a first optical unit provided outside the first substrate and configured to receive light and emits the light, as circularly polarized light, to the liquid crystal display panel, and a second optical unit provided outside the second substrate and configured to emit the circularly polarized light coming through the liquid crystal display panel and emits the light as linearly polarized light, the major axis of each pixel electrode being 160 µm or less long, value obtained by dividing a height of the projections by a gap d between the first and second substrates being 0.14 to 0.6, the projections being 15 µm or less wide as measured in the first direction, and the projections being substantially semicircular and are opposed to center parts of the pixel electrodes, respectively.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a plan view depicting the pixel electrodes and projections of a liquid crystal display apparatus according to Embodiment 4 of the embodiment of the present invention, as seen from the counter substrate;

FIG. 7 is a magnified plan view showing one of the pixel electrodes and one of the projections, which are shown in FIG. 6;

FIG. 8 is a table showing how the aperture ratio and optical characteristics of the liquid crystal display apparatuses according to Embodiments 1 to 4 of the embodiment of the invention vary when the diagonal image size, the pixel pitch, the pixel size and the projection width are changed;

FIG. 13 is a graph representing the relation between changing of the response speed of a liquid crystal display apparatus according to the embodiment of the invention and the minimum distance between one side of each projection and one end of the corresponding pixel electrode, measured in a first direction;

FIG. 16 is a table showing diagram the aperture ratio and optical characteristics the liquid crystal display apparatus according to the Comparative Example of the embodiment of the present invention.

DETAILED DESCRIPTION OF THE INVENTION

The liquid crystal display apparatus according to this embodiment of the invention will be described in detail, with reference to the accompanying drawings.

Figure 1:
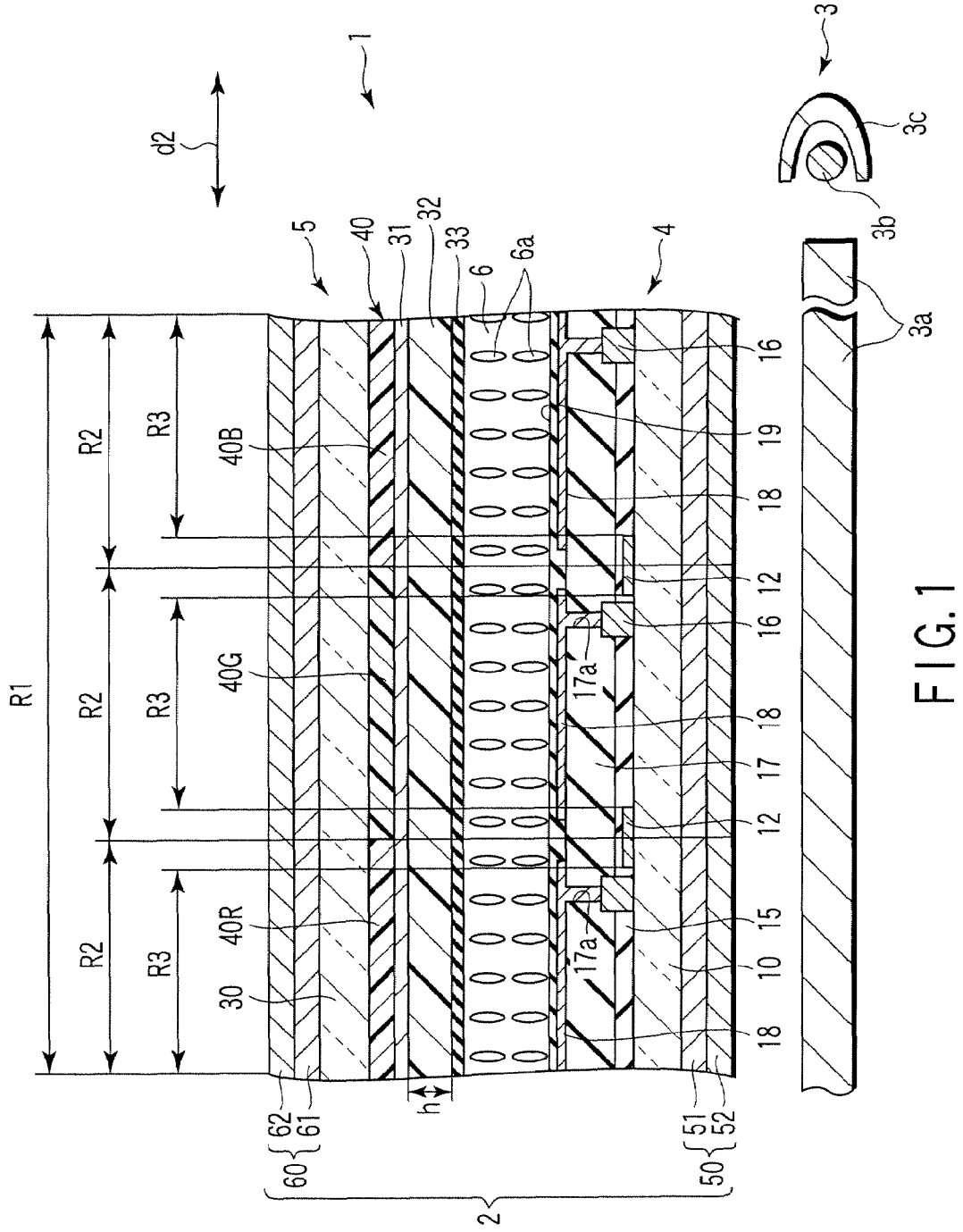
FIG. 1 is a sectional view of a liquid crystal display apparatus according to Embodiment 1 of an embodiment of the invention.
Figure 2:
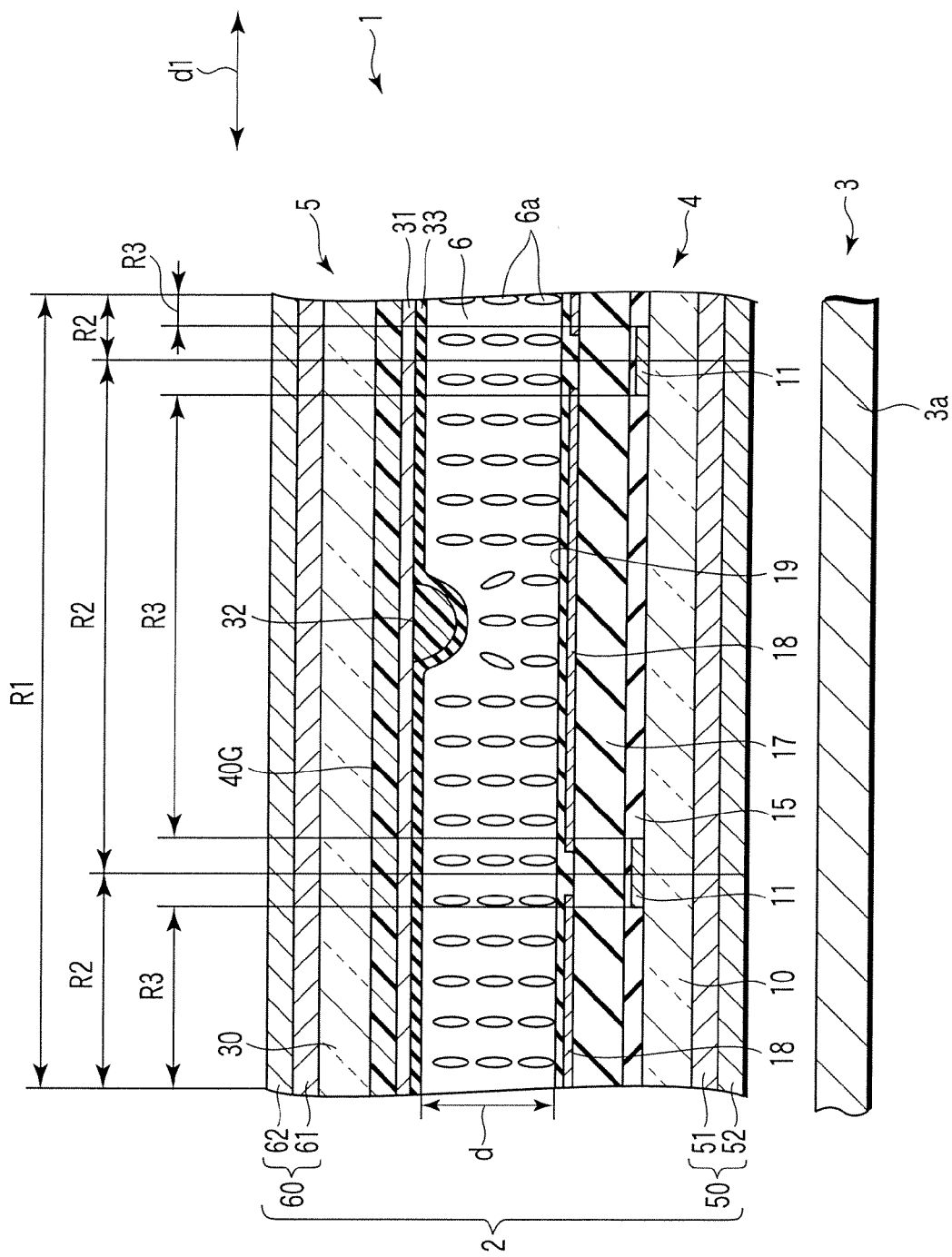
FIG. 2 is another sectional view of the liquid crystal display apparatus shown in FIG. 1.
Figure 3:
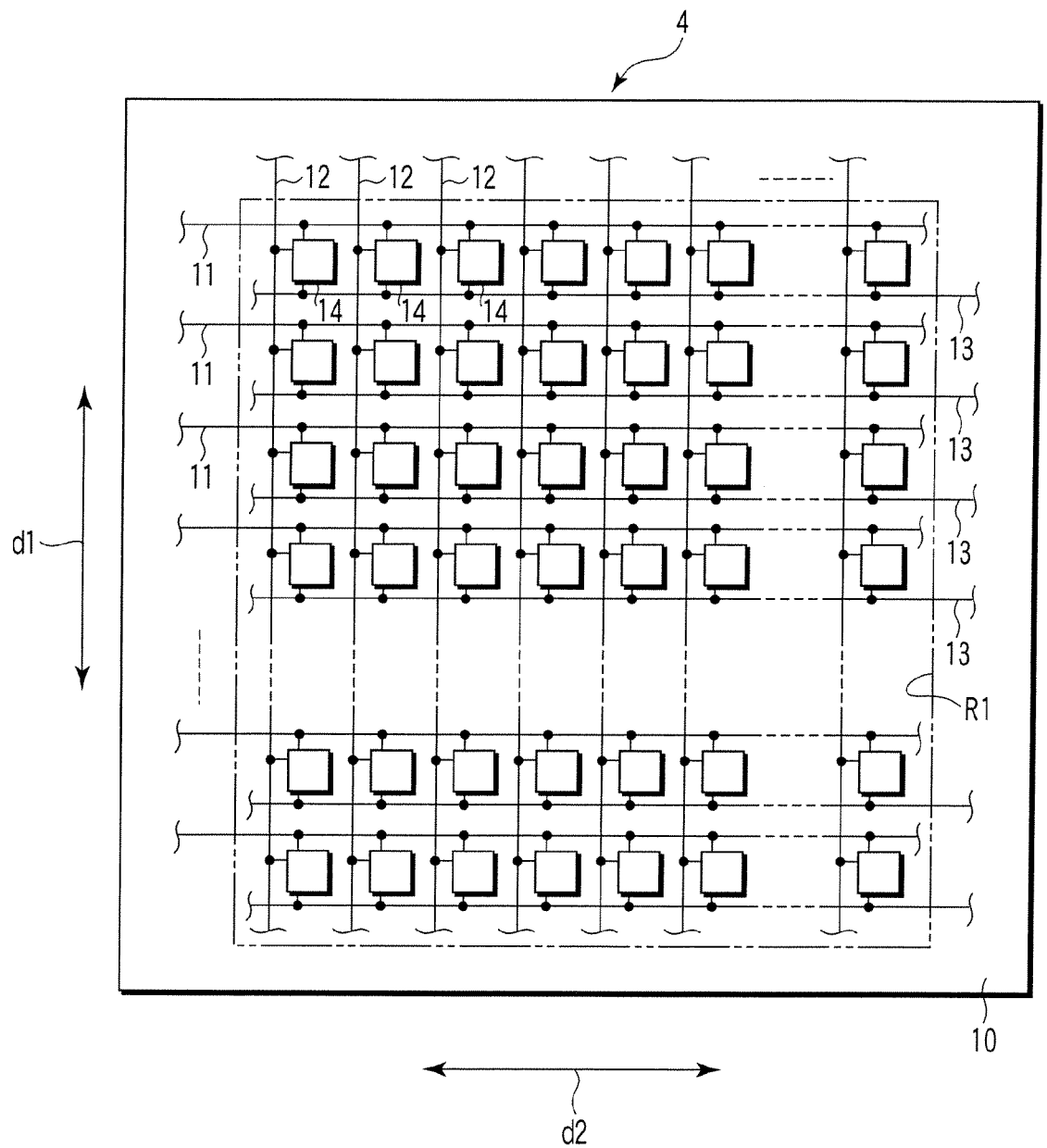
FIG. 3 is a plan view of the array substrate shown in FIGS. 1 and 2.
Figure 4:
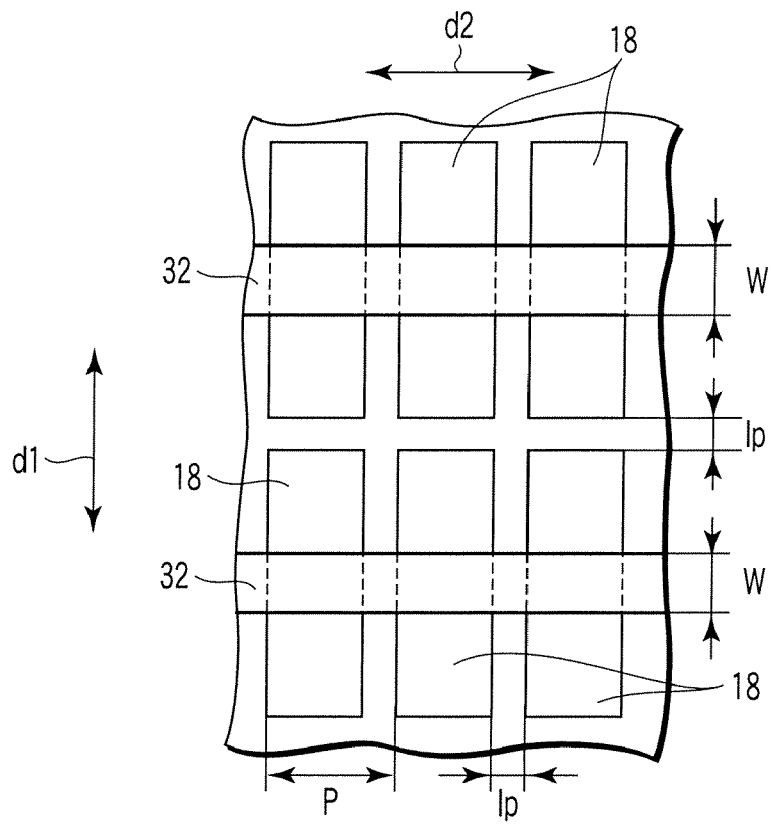
FIG. 4 is a plan view showing the pixel electrodes and projections of the liquid crystal display apparatus according to Embodiment 1, as seen from the counter substrate.

As shown in FIGS. 1 to 3, a liquid crystal display apparatus of transmissive type comprises a liquid crystal display panel 1, an optical unit 2, and a backlight unit 3.

The liquid crystal display panel 1 comprises an array substrate 4, a counter substrate 5 arranged opposite to the array substrate with a predetermined gap therebetween, and a liquid crystal layer 6 held between the array substrate 4 and the counter substrate 5. The array substrate 4 is the first substrate. The counter substrate 5 is the second substrate. The liquid crystal display panel 1 has display region R1 that overlaps the array substrate 4 and the counter substrate 5. The liquid crystal display panel 1 has a plurality of pixel regions R2. The pixel regions R2 have transparent regions R3, which are provided in a display region R1. The pixel regions R2 are arranged in rows and column, forming a matrix. The rows extend in the first direction d1, and the columns extend in the second direction d2.

The array substrate 4 includes a glass substrate 10, which serves as a transparent insulating substrate. On the glass substrate 10, scanning lines 11 and signal lines 12 are arranged in matrix in the display region R1. On glass substrate 10, too, auxiliary capacity lines 13 are provided and extended parallel to the scanning lines. In this embodiment, each transparent region R3 surrounded by two adjacent scanning lines 11 and two adjacent signal lines 12. On glass substrate 10, one pixel unit 14 is formed for each pixel region R2.

One of the pixel units 14, which are identical, will be described in detail.

The pixel unit 14 has a pixel electrode 18, a TFT 16, and an auxiliary capacity element (not shown). The pixel electrode 18 made of a transparent conducting film such as ITO (indium tin oxide). The TFT 16 is connected to the pixel electrode 18 and TFT 16 works as a switching element. The TFT 16 and the auxiliary capacity element are formed on the glass substrate 10, together with scanning lines 11, signal lines 12, and an insulating layer 15. An interlayer insulation film 17 is formed on the insulating layer 15 and the TFT 16.

The pixel electrode 18 is formed on the interlayer insulation film 17 and connected to TFT 16 via a contact hole 17a made in interlayer insulation film 17. The pixel electrode 18 has a major axis that extends in the first direction d1. The edge of the pixel electrode 18 overlaps the scanning line 11 and the signal line 12. Therefore, pixel electrode 18 overlaps the pixel region R2 and the transparent region R3. An alignment film 19 of vertically alignment type is formed on the glass substrate 10 and the pixel electrodes 18.

The counter substrate 5 includes a glass substrate 30, which serves as a transparent insulating substrate. In the display region, red-colored layers 40R, green-colored layers 40G and blue-colored layers 40B are formed on glass substrate 30. The colored layers 40R, 40G, and 40B form a color filter 40. A counter electrode 31 made of a transparent conducting film such as of ITO is formed on the glass substrate 30 and color filter 40.

A plurality of projections 32 are formed on the counter electrode 31. The projections 32 are provided on the counter electrode 31 and overlap the pixel electrodes 18. The projections 32 are located with a space to the opposite edges of the circumference of the pixel electrodes 18, as viewed in the first direction d1. The projections 32 protrude toward the array substrate 4. The projections 32 control the inclined direction in which the liquid crystal molecules 6a of the liquid crystal layer 6 opposed to the pixel electrodes 18 incline. On the glass substrate 30 and projections 32, an alignment film 33 of vertically alignment type is formed.

The array substrate 4 and the counter substrate 5 are arranged opposite to each other with a gap therebetween by the columnar spacers (not shown) serving as spacers. The array substrate 4 and the counter substrate 5 are bonded together with a sealing member (not shown) provided in the edge portions of both of the substrates. A liquid crystal layer 6 is formed in the field surrounded by array substrate 4, counter substrate 5, and sealing member. A liquid crystal layer 6 is made of fluorine-based liquid crystal material. The liquid crystal material is of n type and has Δn (anisotropic refractive index) of 0.09, Δ∈ (anisotropic dielectric constant) of −5, and rotation viscosity coefficient 100 mPa·S. As described above, the liquid crystal layer 6 is made of liquid crystal material having negative anisotropic dielectric constant.

The optical unit 2 includes a first optical unit 50 and a second optical unit 60. The first optical unit 50 is provided outside the array substrate 4. The second optical unit 60 is provided outside the counter substrate. The first optical unit 50 has a phase-contrast plate 51 and a polarizing plate 52. The phase-contrast plate 51 has a phase difference of 1/4 and a transmission-easy axis 51a. The polarizing plate 52 is formed on the phase-contrast plate 51 and has a transmission axis 52a that defines an angle 45° with the transmission-easy axis 51a. The phase-contrast plate 51 and the polarizing plate 52 are laid one on the other, forming a laminate.

The second optical unit 60 has a phase-contrast plate 61 and a polarizing plate 62. The phase-contrast plate 61 has a phase difference of 1/4 and a transmission-easy axis 61a. The polarizing plate 62 is formed on the phase-contrast plate 61 and has a transmission axis 62a that defines an angle 45° with the transmission-easy axis 61a. The phase-contrast plate 61 and the polarizing plate 62 are laid one on the other, forming a laminate.

The backlight unit 3 is provided on a side of the external surface of the polarizing plate 52. The backlight unit 3 has a light guide 3a, a light source 3b, and a reflector 3c. The light guide 3a is opposed to the polarizing plate 52 and includes a light guiding plate. The light source 3b and the reflector 3c face one side of the light guide 3a.

Thus, the first optical unit 50 receives the backlight and converts it to circularly polarized light, which is applied to the liquid crystal display panel 1. The second optical unit 60 receives the circularly polarized light coming through the liquid crystal display panel 1 and converts it to linearly polarized light. In this embodiment, the optical unit 2 operates in the circularly polarized light mode.

In this mode, the ellipticity is set to 1 for light beams having wavelengths ranging from 530 nm to 580 nm.

The liquid crystal display apparatus described above will be explained in terms of configuration.

EMBODIMENT 1

Embodiment 1 is a liquid crystal display apparatus, which may be used as display unit of a portable terminal as can be understood from FIGS. 1, 2, 4, 5 and 8. The size of a display of the apparatus is 2.4 inches in terms of the diagonal. It has pixels arranged in 640 (in vertical direction, or first direction d1) and 480 (in horizontal direction, or second direction d2). It is a liquid crystal display apparatus of VGA color active-matrix type. Each pixel is composed of three pixel units, i.e., red, green and blue units. Hence, the apparatus has 640 (in vertical direction)×1440(in horizontal direction) pixels. The resolution (pixel pitch) is 332 ppi.

The size of pixel unit 14 is 75 µm (in vertical direction)×25 µm (in horizontal direction). The pixel electrode 18 is rectangular. Gap lp between the peripheries of any two adjacent pixel electrodes 18 is about 8 µm.

The projections 32 have a substantially semicircular cross section. They are shaped like a stripe, extending in the second direction d2 (thus extending parallel to the shorter sides of each pixel electrode). The projections 32 are provided in one-to-one correspondence for the pixel electrode 18 arranged in the second direction. Each projection 32 is located at a position (pixel center), dividing one pixel electrode 18 provided in the transparent region R3, into two parts of almost the same size, which are arranged side by side in the first direction d1. The projections 32 have a width W of about 10 µm in the first direction d1 and a height h of about 1.5 µm. They are made of acrylic photosensitive resin. The display mode of the liquid crystal display apparatus is 2-division MVA mode.

The array substrate 4 provided in picture element region R2 and not overlapping the projection 32 is spaced from the counter substrate 5, forming a gap d of 3 µm. The height h of the projections is half (0.5) the gap d. The height h of the projections 32 divided by the gap d is 0.5.

Figure 5:
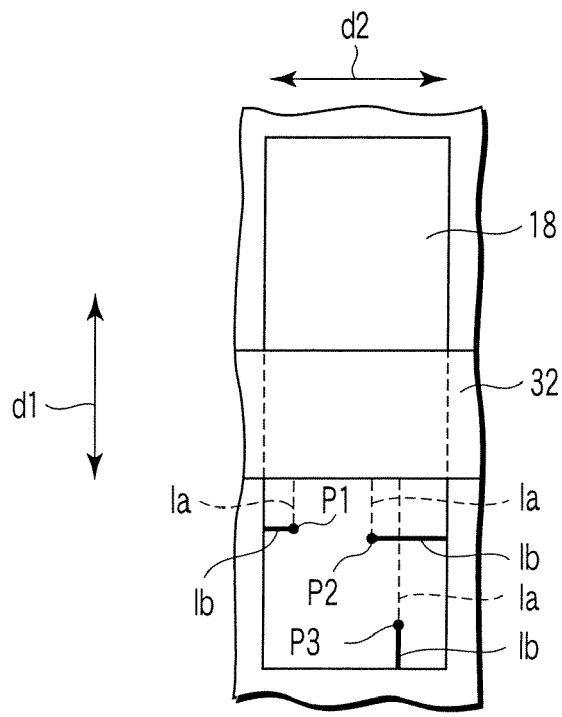
FIG. 5 is a magnified plan view depicting one of the pixel electrodes and one of the projections, which are shown in FIG. 4.

The liquid crystal display apparatus is designed, satisfying the following relation (1):

$$MIN(la, lb)/d < 10 \qquad (1)$$

where, as shown in FIG. 5, la is the shortest distance between projection 32 and the position coordinate P of a pixel electrode 18 not overlapping projection 32 but overlapping the transparent region R3, lb is the shortest distance between the position coordinate P and the end of the pixel electrode that overlaps the transparent region R3 closer to the position coordinate P than any other transparent region, and MIN (la, lb) is the shorter of the these distances la and lb.

In FIG. 5, for a given position coordinate P1 (la, lb)=(7 µm, 5 µm), MIN (la, lb) is 5 µm, and MIN (la, lb)/d is 1.7 (=5/3<10). This value satisfies the relation (1). Further, for given position coordinates P2 and P3, MIN (la, lb) satisfies the relation (1), as specified below:

For P2 (la, lb)=(8(m, 10(m):MIN(la, lb)/d=8/3=2.7<10

For P3 (la, lb)=(20(m, 4(m):MIN(la, lb)/d=4/3=1.3<10

The liquid crystal display apparatus is configured such that projections 32 are arranged, maximizing the effective aperture ratio, while satisfying the relation (1) specified above. That is, the total area S (relative aperture ratio) of the pixel electrodes 18 not overlapping the projections but overlapping the transparent regions R3 is 34%, which is the maximum value.

As shown in FIG. 8, the liquid crystal display apparatus satisfies the relation (1) and has the maximum total area S of transparent pixel electrodes. Nevertheless, the display can maintain sufficient alignment stability in all pixel regions R2. The transmissivity is 3.3%, the contrast ratio is 450. Thus, the liquid crystal display apparatus exhibits good optical characteristics.

EMBODIMENT 2

A liquid crystal display apparatus of Embodiment 2 is used as display unit of, for example, a portable terminal. A display of the apparatus has a size of 2.8 inches in terms of diagonal and is a little larger than the display according to Embodiment 1. It has 640 (in vertical direction)×480 (in horizontal direction) pixels. It is a liquid crystal display apparatus of VGA color active-matrix type. Its resolution (i.e., pixel pitch p) is 286 ppi. The size of each pixel 14 is 90 µm×30 µm.

The liquid crystal display apparatus according to Embodiment 2 satisfies the relation (1) given above. The projections 32 are arranged in an optimal state that meets the relation (1). That is, they are so arranged that the effective aperture ratio is maximal. The total area S of the transparent pixel electrodes (i.e., relative opening ratio) is 45%, which is the maximum value.

As seen from in FIG. 8, sufficient alignment stability is achieved in all pixel regions R2 in the liquid crystal display apparatus that satisfies the relation (1), though the total area S of the transparent pixel electrodes is maximal. The transmissivity is 4.3%, and the contrast ratio is 480. Thus, the liquid crystal display apparatus according to Embodiment 2 exhibits good optical characteristics.

EMBODIMENT 3

A liquid crystal display apparatus according to Embodiment 3 is for use as display unit of, for example, a portable terminal. A display of the apparatus has a size of 2.8 inches in terms of diagonal, and is as large as the display according to Embodiment 2. It has 640 (in vertical direction)×480 (in horizontal direction) pixels. It is a color liquid crystal display apparatus of VGA color active-matrix type. It differs in structure from the apparatus according to Embodiment 2, only in that the projections 32 are shaped, having a relatively large aspect ratio. More precisely, the projections 32 have a width W of about 7 μm as measured in the first direction d1 and a height h of about 1.5 μm.

The liquid crystal display apparatus according to Embodiment 3 satisfies the relation (1) set forth above. The projections 32 are arranged in such an optimal state so that the effective aperture ratio may be maximized, falling within the range of the relation (1). The total area S of transparent pixel electrodes (i.e., relative aperture ratio) is 48%, which is a maximal value.

As evident from in FIG. 8, sufficient alignment stability is achieved in all pixel regions R2 in the liquid crystal display apparatus that satisfies the relation (1), though the total area S of the transparent pixel electrodes is maximal. The transmissivity is 4.6%, and the contrast ratio is 500.Thus, the liquid crystal display apparatus according to Embodiment 3 exhibits good optical characteristics.

EMBODIMENT 4

A liquid crystal display apparatus according to Embodiment 4 is for use as the display unit of, for example, a portable terminal. A display of the apparatus has a size of 2.8 inches in terms of diagonal, and is as large as the displays according to Embodiments 2 and 3. It has 640 (in vertical direction)×480 (in horizontal direction) pixels. It is a color liquid crystal display apparatus of VGA color active-matrix type. It differs from the apparatuses according to Embodiments 2 and 3, in respect of the projections 32 only.

As shown in FIGS. 6 and 7, the projections 32 are provided on the counter substrate 5 and overlap the pixel electrodes 18. Each projection 32 is positioned, facing the center part of the pixel electrode 18 that overlap the transparent region R3. The projections 32 are semicircular. They have a diameter D (width W in the first direction d1 and width of the second direction d2) is about 15 μm, and a height h of about 1.5 μm. The projections 32 are made of ordinary photosensitive acrylic resin. Therefore, they can be prepared at low cost.

The projections 32 are provided, each for one pixel electrode 18. Each projection 32 is spaced from those sides of the pixel electrode 18 that extend in the first direction d1 and the second direction d2, respectively. The liquid crystal display apparatus according to Embodiment 4 operates in MVA mode of continuous radial-aligned type. Needless to say, the projections 32 can control the direction to which the liquid crystal molecules 6a constituting the liquid crystal layer 6 incline. The liquid crystal molecules 6a of the liquid crystal layer 6 that faces the projections 32 are aligned in radial direction from the projections 32.

The liquid crystal display of Embodiment 4 satisfies the relation (1) given above. The relation (1) is satisfied at, for example, position coordinates P4, P5, P6, and P7. The projections 32 are arranged in such an optimal state so that the effective aperture ratio may be maximized, falling within the range of the relation (1). The total area S of transparent pixel electrodes (i.e., relative aperture ratio) is 48%, which is a maximal value.

As seen from in FIG. 8, sufficient alignment stability is achieved in all pixel regions R2 in the liquid crystal display apparatus that satisfies the relation (1), though the total area S of the transparent pixel electrodes is maximal. The transmittivity is 4.6%, and the contrast ratio is 500. Thus, the liquid crystal display apparatus according to Embodiment 4 exhibits good optical characteristics.

EMBODIMENT 5

A liquid crystal display apparatus according to Embodiment 5 is for use as display unit of, for example, a portable terminal. A display of the apparatus has a size of 2.8 inches in terms of diagonal, and is as large as the display according to Embodiment 2. It has 640 (columns)×480(in horizontal direction) pixels. It is a color liquid crystal display apparatus of VGA color active-matrix type, too. It differs from the apparatus according to Embodiment 2, only in respect of the pixel electrodes 18.

Figure 9:
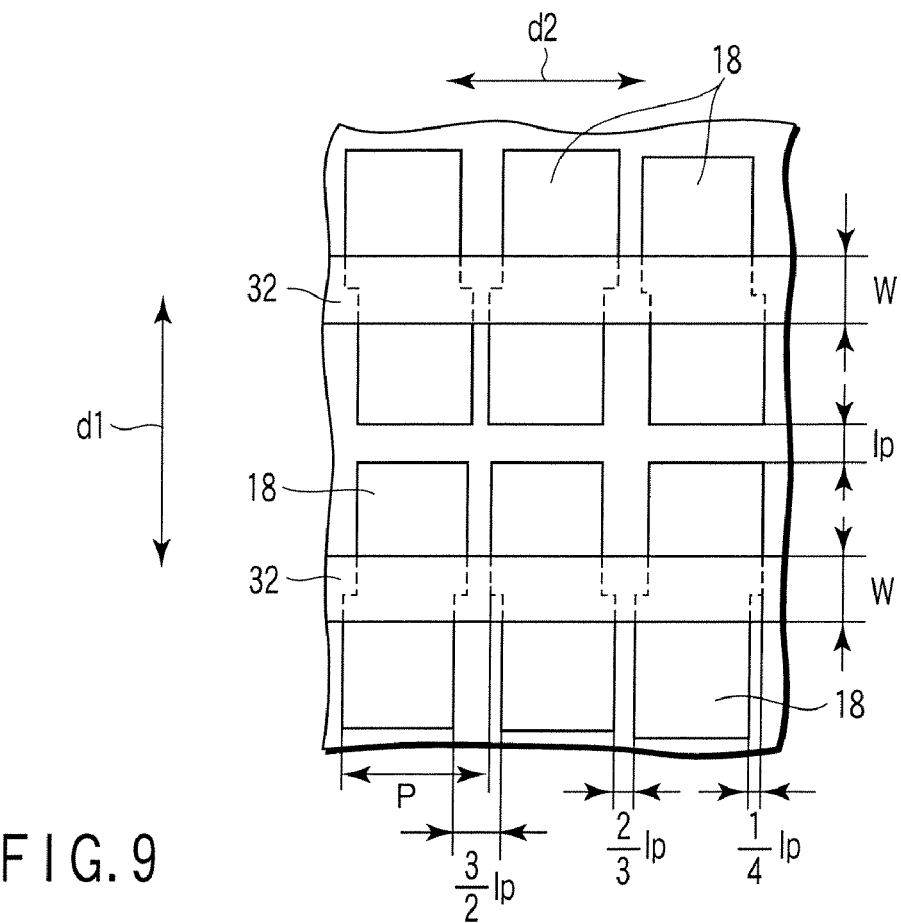
FIG. 9 is a plan view showing the pixel electrodes and projections of a liquid crystal display apparatus according to Embodiment 5 of the embodiment of the invention, as seen from the counter substrate.
Figure 10:
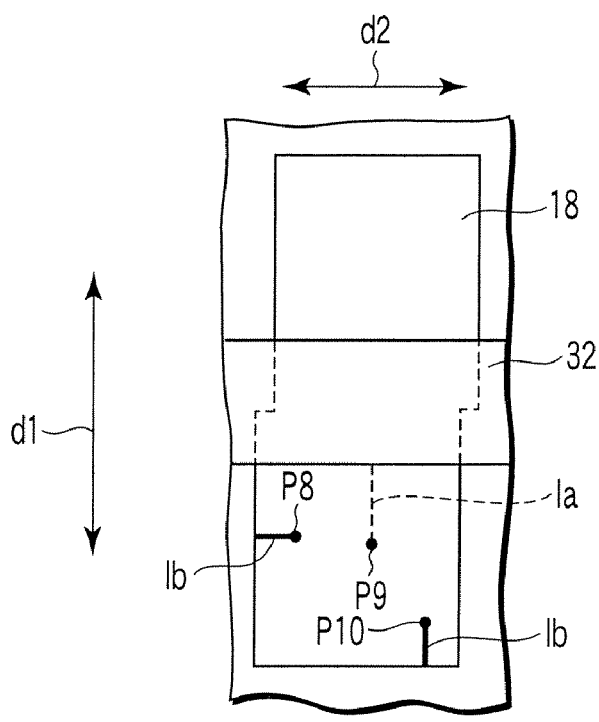
FIG. 10 is a magnified plan view depicting one of the pixel electrodes and one of the projections, which are shown in FIG. 9.

As shown in FIGS. 9 and 10, unlike in Embodiment 2, each pixel element electrode 18 composed of two parts of the same size, which are arranged side by side in the first direction d1 and which are displaced with respect to each other in the second direction by about Ip/4. Any adjacent two parts, whether viewed in the first direction or the second direction, are symmetrical in shape to each other.

The liquid crystal display apparatus according to Embodiment 5 satisfies the relation (1) set forth above. The relation (1) is satisfied at, for example, position coordinates P8, P9, and P10. The projections 32 are arranged in such an optimal state so that the effective aperture ratio may be maximized, falling within the range of the relation (1). The total area S of transparent pixel electrodes (i.e., relative aperture ratio) is of a maximal value.

Sufficient orientation stability is achieved in all pixel regions R2 in the liquid crystal display apparatus that satisfies the relation (1), Sufficient alignment stability is achieved in all pixel regions R2 in the liquid crystal display apparatus that satisfies the relation (1), though the total area S of the transparent pixel electrodes is maximal. The sides of ach pixel electrode 18, isolated by a projection 32 in the first direction d1, are asymmetrical to each other. Hence, Embodiment 5 is superior to Embodiment 2 in terms of alignment stability. The liquid crystal display apparatus according to Embodiment 5 exhibits good optical characteristics, too.

EMBODIMENT 6

A liquid crystal display apparatus according to Embodiment 6 is for use as display unit of, for example, a portable terminal. A display of the apparatus has a size of 2.8 inches in terms of diagonal, and is as large as the display according to Embodiment 2. It has 640 (in vertical direction)×480 (in horizontal direction) pixels. It is a color liquid crystal display apparatus of VGA color active-matrix type, too. It differs from the apparatus according to Embodiment 5, only in respect of the projections 32.

Figure 11:
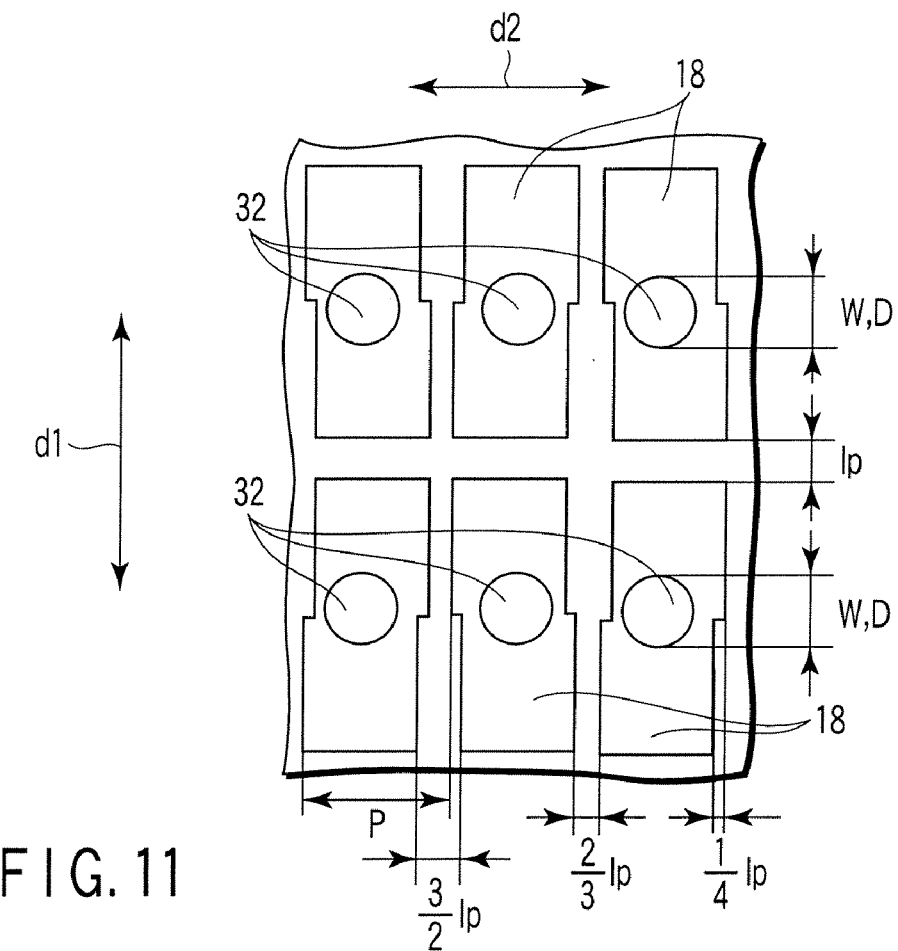
FIG. 11 is a plan view showing the pixel electrodes and projections of a liquid crystal display apparatus according to Embodiment 6 of the embodiment of the invention, as seen from the counter substrate.
Figure 12:
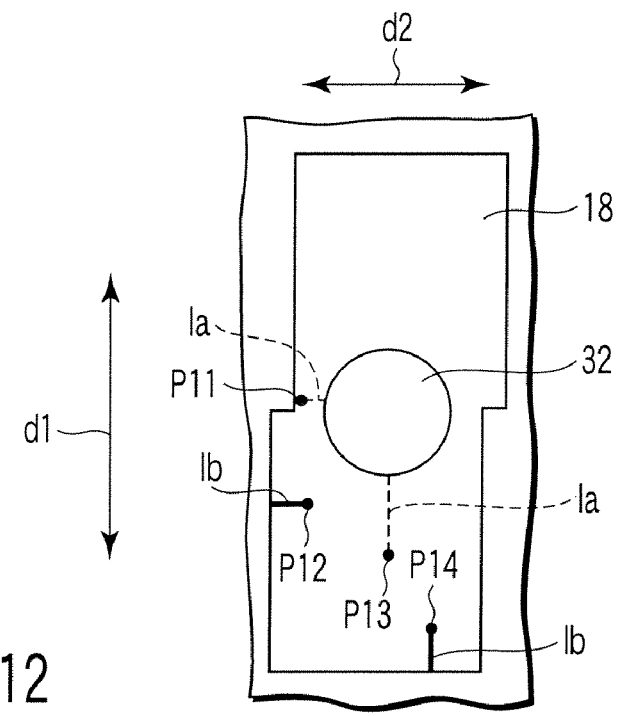
FIG. 12 is a magnified plan view showing one of the pixel electrodes and one of the projections, which are shown in FIG. 11.

As shown in FIGS. 11 and 12, the projections 32 are semicircular as in Embodiment 4. Each projection 32 is provided on the center part of a pixel electrode 18 that overlaps the transparent region R3. The projections 32 have a diameter D (width W in the first direction d1 and width of the second direction d2) is about 15 μm, and a height h of about 1.5 μm. Each projection 32 is spaced from those sides of the pixel electrode 18 that extend in the first direction d1 and the second direction d2, respectively.

The liquid crystal display apparatus according to Embodiment 6 satisfies the relation (1) given above. The relation (1) is satisfied at, for example, position coordinates P11, P12, P13, and P14. The projections 32 are arranged in such an optimal state so that the effective aperture ratio may be maximized, falling within the range of the relation (1). The total area S of transparent pixel electrodes (i.e., relative aperture ratio) is of a maximal value.

The liquid crystal display apparatus according to Embodiment 6 satisfies the relation (1) and attains sufficient alignment stability though the total area S of the transparent pixel electrodes is maximal. The sides of ach pixel electrode 18, isolated by a projection 32 in the first direction d1, are asymmetrical to each other. Hence, Embodiment 6 can have high alignment stability. This liquid crystal display apparatus exhibits good optical characteristics.

In any structural features other than those specified above, Embodiments 2 to 6 are identical to Embodiment 1. Therefore, the components identical to those of Embodiment 1 are designated at the same reference numbers and have not been described in detail.

Comparative Example of a liquid crystal display, which has a lower transmittivity and a smaller contrast ratio, will be described. Comparative Example is similar to the embodiments described above, and the components identical to those of any embodiment are designated at the same reference numbers and will not be described in detail.

COMPARATIVE EXAMPLE

Figure 14:
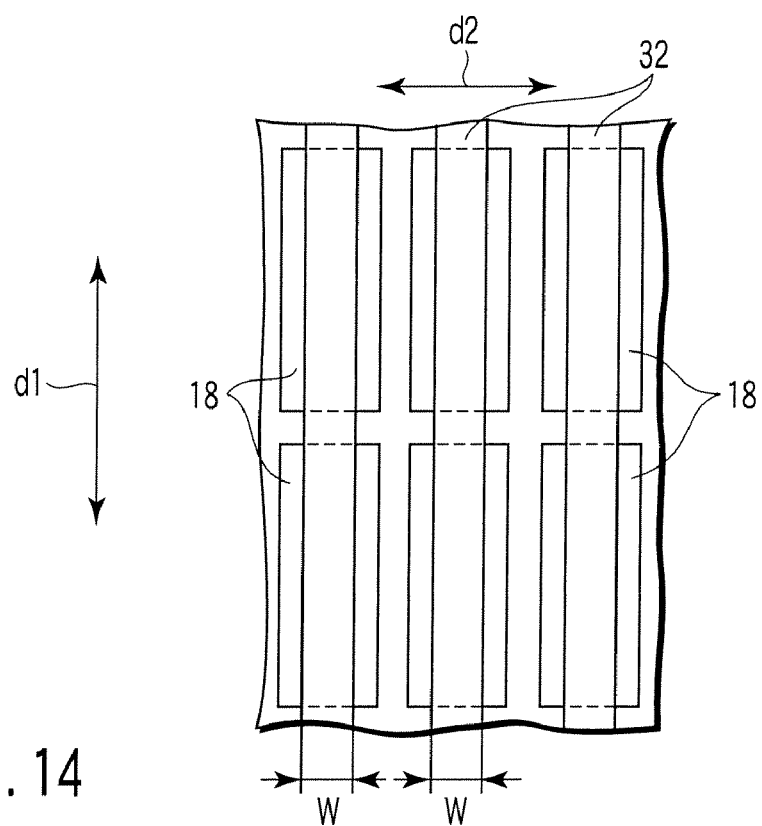
FIG. 14 is plan view showing the pixel electrodes and projections of a liquid crystal display apparatus according to a Comparative Example of the embodiment of the invention, as seen from the counter substrate.
Figure 15:
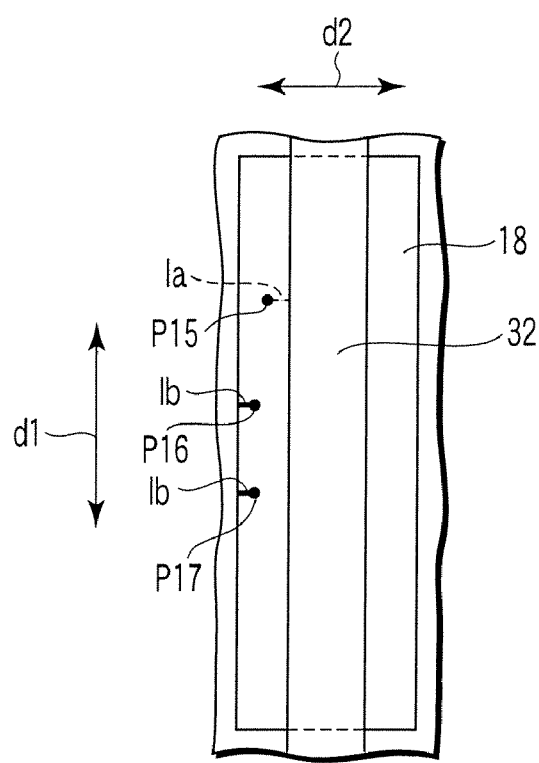
FIG. 15 is a magnified plan view depicting one of the pixel electrodes and one of the projections, which are shown in FIG. 14.

As shown in FIGS. 14, 15 and 16, a display of the liquid crystal display apparatus according to Comparative Example has a size of 2.4 inches in terms of diagonal. It has 640 (in vertical direction)×480 (in horizontal direction) pixels and is a color liquid crystal display apparatus of VGA color active-matrix type. Its resolution (i.e., pixel pitch p) is 332 ppi.

The size of each pixel 14 is 75 μm×25 μm. The pixel electrodes 18 are rectangular.

The projections 32 of Comparative Example have a cross section that is almost semicircular. They are shaped like a stripe, extending in the first direction d1. Each projection 32 overlaps pixel electrodes 18 arranged in the first direction d1, extending as if it divided each pixel electrode 18 overlapping a transparent region R3, into two parts of the same size, along the centerline the pixel electrode 18. The projections 32 have a width W of about 10 μm in the second direction d2 and a height h of about 1.5 μm. The display mode of the liquid crystal display apparatus according to Comparative Example is 2-division MVA mode.

The liquid crystal display apparatus according to Comparative Example satisfies the relation (1). The relation (1) is satisfied at, for example, position coordinates P15, P16 and P17. This apparatus satisfies the condition for displaying high-resolution images and has projections 32 extending in the first direction d1. Therefore, the total area S of transparent pixel electrodes (i.e., relative aperture ratio) is as low as 12%, and the transmittivity is as low as 1.1%. Further, the contrast ratio is as small as 100. Consequently, the liquid crystal display apparatus according to Comparative Example does not exhibit good optical characteristics.

This is inevitably because the ratio of the projections 32 to the pixel electrodes 18 in terms of area more increases than the aperture ratio decreased due to the high resolution of images and the projections 32. As a result, the effective aperture ratio decreases, and the amount of light passing at the projections 32 increases. The amount of light passing at the projections 32 increases, because the liquid crystal molecules undergo pre-tilting at the edges of each projection 32.

In view of the transmittivity and the contrast ratio, it is desired that the area the projections 32 occupy in the transparent regions R3 be reduced as much as possible. In the liquid crystal display apparatus according to Comparative Example, since the composition for a high-definition, and a high aperture ratio and a high contrast ratio have the relation of a tradeoff, coexistence is difficult.

In the liquid crystal display apparatuses according to the embodiment, the projections 32 extend in the second direction d2, each dividing a pixel electrode 18 into two parts of the same size which are arranged side by side in the first direction d1, and they are shaped like a stripe. If the projections 32 are semicircular, each is provided on the center part of a pixel electrode 18 and spaced from those sides of the pixel electrode 18 that extend in the first direction d1 and the second direction d2, respectively. The projections 32 of the embodiment are arranged in such an optimal state so that the effective aperture ratio may be maximized, falling within the range of the relation (1). Hence, the total area S of the transparent pixel electrodes can be of a maximum value, even if the apparatus satisfies the condition for displaying high-resolution images. The liquid crystal display apparatus according to any embodiment of this invention can acquire good optical characteristics, such as high transmittivity and high contrast ratio. Since the liquid crystal display apparatus satisfies the relation (1) given above, the projections 32 and/or the edge electric fields of the pixel electrodes 18 act at all position coordinate P. The display can therefore preserve sufficient alignment stability. Hence, it exhibits not only high transmittivity and high contrast ratio, but also high alignment stability.

In the embodiment of this invention, each projection 32 extends in the second direction d2. Liquid crystal molecules 6a are therefore oriented in the first direction d1 or the second direction d2. In other words, they are aligned upward, downward, leftward and rightward in the display screen. Hence, the liquid crystal display apparatus can have a larger visual angle than in the case where the projections 32 extend perpendicular to a diagonal line.

The stripe-shaped projections 32 are arranged, as if dividing the pixel electrodes 18 in the major axial direction, each into two parts of the same size. The two parts of each pixel electrode 18 are squares or shaped like a square. The edge electric fields applied to the liquid crystal 6 in the direction opposite to the first direction d1, and the edge electric fields applied to the liquid crystal 6 in the direction opposite to the second direction d2 equally act on the two parts of each pixel electrode 18. The liquid crystal molecules 6a can therefore be aligned evenly in the first direction d1 and the second direction d2. In this case, the visual angle can, of course, be increased with respect to both the vertical direction and the horizontal direction.

As shown in FIG. 13, any liquid crystal display apparatus must have a specific response time in order to display images of desired quality. The embodiment of this invention can have a response time of at least 30 ms if the shortest distance between the side of each projection 32 in the first direction d1 and the corresponding end of one pixel electrode 18 is 80 μm or less. Thus, the liquid crystal display apparatus can display images of the desired quality if said shortest distance is 80 μm or less.

The apparatus can acquire high transmittivity and a high contrast ratio. The apparatus can therefore display high-resolution images. The liquid crystal display apparatus that display high-resolution images can be provided at high yield and at low cost.

This invention is not limited to the embodiment described above. Various changes and modifications can be made within the scope and spirit of the invention. For example, even if the total area S of the transparent pixel electrodes is close to, but not the very maximum value, the same advantages can be attained as in the case where the total area S has the maximum value. The value close to the maximum value, as used here, means at least 70%, but less than 100%, of the maximum value.

The major axis of the pixel electrodes 18 should be 160 μm or less, and more preferably should be 67.5 μm or less. Value of h/d should be 0.14 to 0.6. The projections 32 should be have a width W of 15 μm or less, as measured in the first direction d1. The projections 32 should have a height h of 0.5 μm to 2 μm and a width d of 2 μm to 5 μm, provided that the ratio the height to the width, h/d, ranges from 0.14 to 0.6. The projections 32, if shaped like a stripe, may have a triangular cross section or any other polygonal cross section.

It suffices for the phase-contrast plates 51 and 61 to have a phase difference of at least 1/4. The angle the transmission axis 52a makes with the transmission-easy axis 51a may range from 30° to 60°. The angle the transmission axis 62a makes with the transmission-easy axis 61a may range from 30° to 60°. The optical unit 2 may be set in the circularly polarized light mode or the elliptically polarized light mode in which the ellipticity is 0.4 or more, but not exceeding 1, for light beams having wavelengths ranging from 530 nm to 580 nm.

The alignment stability may be enhanced making slits, holes or notches in the pixel electrodes 18, thereby improving the asymmetry of the electric field applied to liquid crystal layer 6, or by optimizing the electric-field response of the liquid crystal molecules 6a.

The liquid crystal display apparatus can acquire the above-mentioned advantages, even if the resolution (i.e., pixel pitch p) is 210 ppi or more. Several projections 32 may be laid, one upon another, on each pixel electrodes. The liquid crystal display apparatus is not limited to a transmissive type; it may be a semi-transmissive type.

What is claimed is:

1. A liquid crystal display apparatus comprising:
   a liquid crystal display panel which includes a first substrate, a second substrate arranged opposite to the first substrate with a gap, a liquid crystal layer held between the first and second substrates and made of liquid crystal having negative anisotropic dielectric constant, a plurality of pixel electrodes arranged on the first substrate in the form of a matrix, in a first direction and a second direction intersecting with the first direction at right angles, each pixel electrode having a major axis extending in the first direction, and a plurality of projections provided on the second substrate, overlapping the pixel electrodes, spaced from side of the pixel electrode as measured in the first direction, projecting toward the first substrate and configured to control a direction in which liquid crystal molecules align; and
   an optical unit which includes a first optical unit provided outside the first substrate and configured to receive light and emits the light, as circularly polarized light, to the liquid crystal display panel, and a second optical unit provided outside the second substrate and configured to emit the circularly polarized light coming through the liquid crystal display panel and emits the light as linearly polarized light,
   the major axis of each pixel electrode being 160 μm or less long,
   value obtained by dividing a height of the projections by a gap d between the first and second substrates being 0.14 to 0.6,
   the projections being 15 μm or less wide as measured in the first direction, and
   MIN (la, lb)/d<10, where la is the shortest distance between a position coordinate of a pixel electrode of the pixel electrodes and one of the projections, which overlaps the pixel electrode, lb is the shortest distance between the position coordinate and an end of the pixel electrode that is closer to the position coordinate than any other pixel electrode, and MIN (la, lb) is the shorter of the these distances la and lb.

2. The liquid crystal display apparatus according to claim 1, wherein the optical unit operates in an elliptically polarized light mode or a circularly polarized light mode, the elliptically polarized light mode employing ellipticity of 0.4 or more and not exceeding 1 for light beams having wavelengths ranging from 530 nm to 580 nm.

3. The liquid crystal display apparatus according to claim 1, wherein the projections are shaped like a stripe, extend in the second direction, are provided on the pixel electrodes along the second direction, respectively, and are so arranged that each divides, along the first direction, the pixel electrode into two parts of almost the same size; the projections have a height ranging from 0.5 μm to 2 μm; and the gap d ranges from 2 μm to 5 μm.

4. The liquid crystal display apparatus according to claim 1, wherein the projections are shaped like a stripe, extend in the second direction, are provided on the pixel electrodes along the second direction, respectively, and are so arranged that each divides, along the first direction, the pixel electrode into two parts of almost the same size; each of the first and second optical units is composed of a polarizing plate having a transmission axis and a phase-contrast plate laid on the polarizing plate, having a phase difference of at least 1/4 and a transmission-easy axis making an angle of 30° to 60° with the transmission axis.

5. The liquid crystal display apparatus according to claim 1, wherein the projections are substantially semicircular and are opposed to center parts of the pixel electrodes, respectively.

6. The liquid crystal display apparatus according to claim 1, wherein each of the pixel electrodes is composed of two parts of the same size, which are arranged side by side in the first direction and which are displaced with respect to each other in the second direction.

7. A liquid crystal display apparatus comprising:
   a liquid crystal display panel which includes a first substrate, a second substrate arranged opposite to the first substrate with a gap therebetween, a liquid crystal layer held between the first and second substrates and made of liquid crystal having negative anisotropic dielectric constant, a plurality of pixel electrodes arranged on the first substrate in the form of a matrix, in a first direction and a second direction intersecting with the first direction at right angles, each pixel electrode having a major axis extending in the first direction, and a plurality of projections provided on the second substrate, overlapping the pixel electrodes, spaced from side of the pixel electrode as measured in the first direction, projecting toward the first substrate, having a height ranging from 0.5 μm to 2 μm and configured to control a direction in which liquid crystal molecules align; and
   an optical unit which includes a first optical unit provided outside the first substrate and configured to receive light and emits the light, as circularly polarized light, to the liquid crystal display panel, and a second optical unit provided outside the second substrate and configured to emit the circularly polarized light coming through the liquid crystal display panel and emits the light as linearly polarized light, the major axis of each pixel electrodes being 160 μm or less long, the first and second substrate being spaced by a gap d which ranges from 2 μm to 5 μm, the projections being 15 μm or less wide as measured in the first direction, and the projections being shaped like a stripe, extending in the second direction, provided on the pixel electrodes along the second direction, respectively, are so arranged that each divides, along the first direction, the pixel electrode into two parts of almost the same size.

8. A liquid crystal display apparatus comprising:

a liquid crystal display panel which includes a first substrate, a second substrate arranged opposite to the first substrate with a gap therebetween, a liquid crystal layer held between the first and second substrates and made of liquid crystal having negative anisotropic dielectric constant, a plurality of pixel electrodes arranged on the first substrate in the form of a matrix, in a first direction and a second direction intersecting with the first direction at right angles, each pixel electrode having a major axis extending in the first direction, and a plurality of projections provided on the second substrate, overlapping the pixel electrodes, spaced from side of the pixel electrode as measured in the first direction, projecting toward the first substrate and configured to control a direction in which liquid crystal molecules align; and an optical unit which includes a first optical unit provided outside the first substrate and configured to receive light and emits the light, as circularly polarized light, to the liquid crystal display panel, and a second optical unit provided outside the second substrate and configured to emit the circularly polarized light coming through the liquid crystal display panel and emits the light as linearly polarized light, the major axis of each pixel electrode being 160 μm or less long, value obtained by dividing a height of the projections by a gap d between the first and second substrates being 0.14 to 0.6, the projections being 15 μm or less wide as measured in the first direction, the projections being shaped like a stripe, extending in the second direction, provided on the pixel electrodes along the second direction, respectively, and so arranged that each divides, along the first direction, the pixel electrode into two parts of almost the same size, and each of the first and second optical units being composed of a polarizing plate having a transmission axis and a phase-contrast plate laid on the polarizing plate, having a phase difference of at least 1/4 and a transmission-easy axis making an angle of 30° to 60° with the transmission axis.

9. A liquid crystal display apparatus comprising:

a liquid crystal display panel which has a first substrate, a second substrate arranged opposite to the first substrate with a gap therebetween, a liquid crystal layer held between the first and second substrates and made of liquid crystal having negative anisotropic dielectric constant, a plurality of pixel electrode arranged on the first substrate in the form of a matrix, in a first direction and a second direction intersecting with the first direction at right angles, each pixel electrode having a major axis extending in the first direction, and a plurality of projections provided on the second substrate, overlapping the pixel electrodes, spaced from side of the pixel electrode as measured in the first direction, projecting toward the first substrate and configured to control a direction in which liquid crystal molecules align; and an optical unit which includes a first optical unit provided outside the first substrate and configured to receive light and emits the light, as circularly polarized light, to the liquid crystal display panel, and a second optical unit provided outside the second substrate and configured to emit the circularly polarized light coming through the liquid crystal display panel and emits the light as linearly polarized light, the major axis of each pixel electrode being 160 μm or less long, value obtained by dividing a height of the projections by a gap d between the first and second substrates being 0.14 to 0.6, the projections being 15 μm or less wide as measured in the first direction, and the projections being substantially semicircular and are opposed to center parts of the pixel electrodes, respectively.

* * * * *